United States Patent
Marinelli et al.

[11] Patent Number: 5,890,796
[45] Date of Patent: Apr. 6, 1999

[54] LASER ILLUMINATED LIGHTING SYSTEM UTILIZING A DIFFRACTIVE OPTICAL ELEMENT

[75] Inventors: Michael Anthony Marinelli, Northville; Jeffrey Thomas Remillard, Ypsilanti, both of Mich.; David Allen O'Neil, Radnor, Pa.; Timothy Fohl, Carlisle, Mass.

[73] Assignee: Ford Global Technologies, Inc., Dearborn, Mich.

[21] Appl. No.: 784,698

[22] Filed: Jan. 16, 1997

[51] Int. Cl.$^6$ ........................................................ F21V 7/04
[52] U.S. Cl. ........................... 362/307; 362/31; 362/511; 362/520
[58] Field of Search .................................. 362/26, 31, 32, 362/307, 308, 309, 328, 511, 520, 552, 553

[56] References Cited

U.S. PATENT DOCUMENTS

| | | |
|---|---|---|
| 4,372,639 | 2/1983 | Johnson . |
| 4,576,436 | 3/1986 | Daniel . |
| 4,577,260 | 3/1986 | Tysoe . |
| 4,586,781 | 5/1986 | Gunther et al. . |
| 4,642,736 | 2/1987 | Masuzawa et al. . |
| 5,165,772 | 11/1992 | Wu . |
| 5,323,302 | 6/1994 | Bertling et al. . |
| 5,369,554 | 11/1994 | Erion .......................................... 362/31 |
| 5,434,754 | 7/1995 | Li et al. . |
| 5,570,951 | 11/1996 | Bertling et al. . |

FOREIGN PATENT DOCUMENTS

| | | |
|---|---|---|
| 0 291 475 A2 | 11/1988 | European Pat. Off. . |
| 2 653 206 - A1 | 4/1991 | France . |
| 2 709 172-A1 | 2/1995 | France . |

Primary Examiner—Y. Quach
Attorney, Agent, or Firm—Steven A. Maynard

[57] ABSTRACT

A lamp assembly for an automotive vehicle includes a remote laser light source coupled with a light transmitting fiber optic light guide which illuminates a unitary thin sheet optic having a diffractive optical element portion, a manifold section, and a kicker section.

13 Claims, 2 Drawing Sheets

LASER ILLUMINATED LIGHTING SYSTEM UTILIZING A DIFFRACTIVE OPTICAL ELEMENT

FIELD OF THE INVENTION

The present invention relates to a vehicle lighting system, and more specifically, to a laser illuminated, unitary thin sheet optic vehicle lighting system which utilizes a diffractive optical element.

BACKGROUND OF THE INVENTION

Conventional light transmission systems used for vehicle head lights or tail lights typically use a bulb and reflector system. In a bulb and reflector system the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. Typically, in an automotive application, a conventional bulb and reflector system collects and reflects only thirty percent of the light emitted from the bulb filament into the useful lighting area.

Bulb and reflector systems have several disadvantages, including aerodynamics and aesthetic styling; e.g., the depth of the reflector along its focal axis and the height of the reflector in directions perpendicular to the focal axis greatly limited attempts at streamlining vehicle contours. Additionally, thermal energy given off by the bulb during operation must be considered and the size of the reflector as well as the material used in its construction vary depending upon the amount of thermal energy generated by the bulb filament. Decreasing the size of the reflector requires use of materials with high thermal resistivity for the reflector.

One approach to develop an automotive lighting system for use with the newer streamlined body designs is proposed in U.S. Pat. No. 5,434,754, assigned to the assignee of the present invention, which discloses the combination of a fiber optic light guide which transmits light from a remote light source, through a light manifold, and to a reflector. There are a number of problems associated with such an approach. First, remote lighting to date is typically a high intensity discharge source coupled with a reflector. The light is focused into a large diameter light guide which transmits the light to the desired location. The high intensity discharge source produces a substantial amount of heat which tends to degrade the light guide. Environmental factors have a further degrading effect on conventionally used light guides. The light guide typically must be 8–12 mm thick in order to capture the requisite amount of light from the source. These guides are very expensive and difficult to work with. Further, this structure requires assembly of a lens, a multifaceted reflector, and a manifold portion to form the vehicle tail light. Also, the manifold portion must be indexed relative to the reflector portion. The manifold is required to expand the incoming light for distribution across the lamp surface. This results in a substantial portion of unlit area required for the manifold and hence a larger foot print of the overall lamp, which results in lighting design inflexibility.

A laser illuminated thin sheet optical element lighting device as disclosed in attorney docket no. 196-0014 entitled Laser Illuminated Lighting System, assigned to the assignee of the present invention, addressed a number of deficiencies in the vehicle lighting arts. However, problems still remain, one of these problems being the large amount of unlit area required for the manifold portion. Also, when using laser light, the light transmitted will vary in intensity from the cross sectional center to the perimeter of the light beam. The intensity variation must be accounted for when designing the manifold section to avoid hot spots of illumination across the lamp surface, adding design cost to the lighting assembly.

Therefore, it would be desirable to provide a laser illuminated, unitary thin sheet optic tail lamp assembly for a vehicle which accommodates manufacturing and thermal considerations as well as the space limitations dictated by vehicular aerodynamic and styling requirements.

SUMMARY OF THE INVENTION

Responsive to the deficiencies in the prior art, the present invention provides a tail lamp assembly that includes a remote laser light source, a light guide connected to the remote laser light source for transmitting light, and a unitary optical element which receives light from the light guide. The unitary optical element has a sheet of optical material with a plurality of reflective facets disposed therein and a diffractive optical element, disposed on an edge of the unitary optical element, for dividing light into a predetermined number of equal intensity beams of light. A single beam of light is directed to a predetermined reflective facet. A kicker portion is adjacent the sheet of optical material having a plurality of reflective steps extending a length of the unitary optical element, each of which is aligned with the plurality of reflective facets and skewed with respect to the front surface.

An advantage of the present invention is the utilization of a diffractive optical element. As a result of the diffractive optical element beams of light of equal intensity are directed to the manifold portion. This eliminates the necessity of having to manipulate the design of the manifold to compensate for varying light intensity distributions that occur when laser light is used. This eliminates the illumination hot spots of the lamp surface of previous designs. Also, use of the diffractive optical element reduces the overall footprint of the thin sheet optical element since a parabolic reflector is not required to manipulate and expand the light.

A further advantage of the present invention, in addition to reducing the overall package size of the tail lamp, is ease of assembly and alignment. The fiber optic light guides of the present invention are approximately 1 mm in diameter and therefore make implementing the tail light assembly into the vehicle much easier. The fiber optic light guides of the present invention are also less expensive than the light guides used in the past. The present remote lighting system, having an integral manifold and kicker section, does not require the extra steps of assembling tail lamp components or indexing the manifold and kicker portions.

A particular advantage of the preferred embodiment of the present invention is ease of manufacture. The manifold and kicker of the thin sheet optic are made integral as a result of being formed in a single injection molding process. In addition, a low profile and highly efficient lighting system can be developed allowing a designer greater latitude with respect to aerodynamic and aesthetic styling.

Additionally, the laser and any associated thermal energy are contained at a remote light source. Only the laser light is transmitted to the thin sheet optic. Any design requirements due to thermal considerations or concerns may now be eliminated.

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
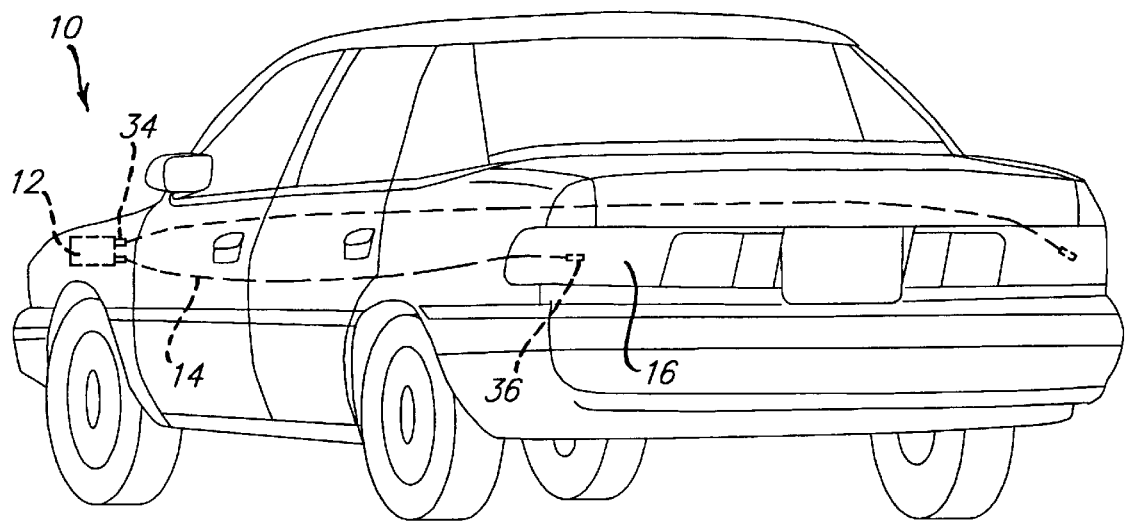
FIG. 1 is a perspective view of an automotive vehicle with a remote vehicle lighting assembly.
Figure 2:
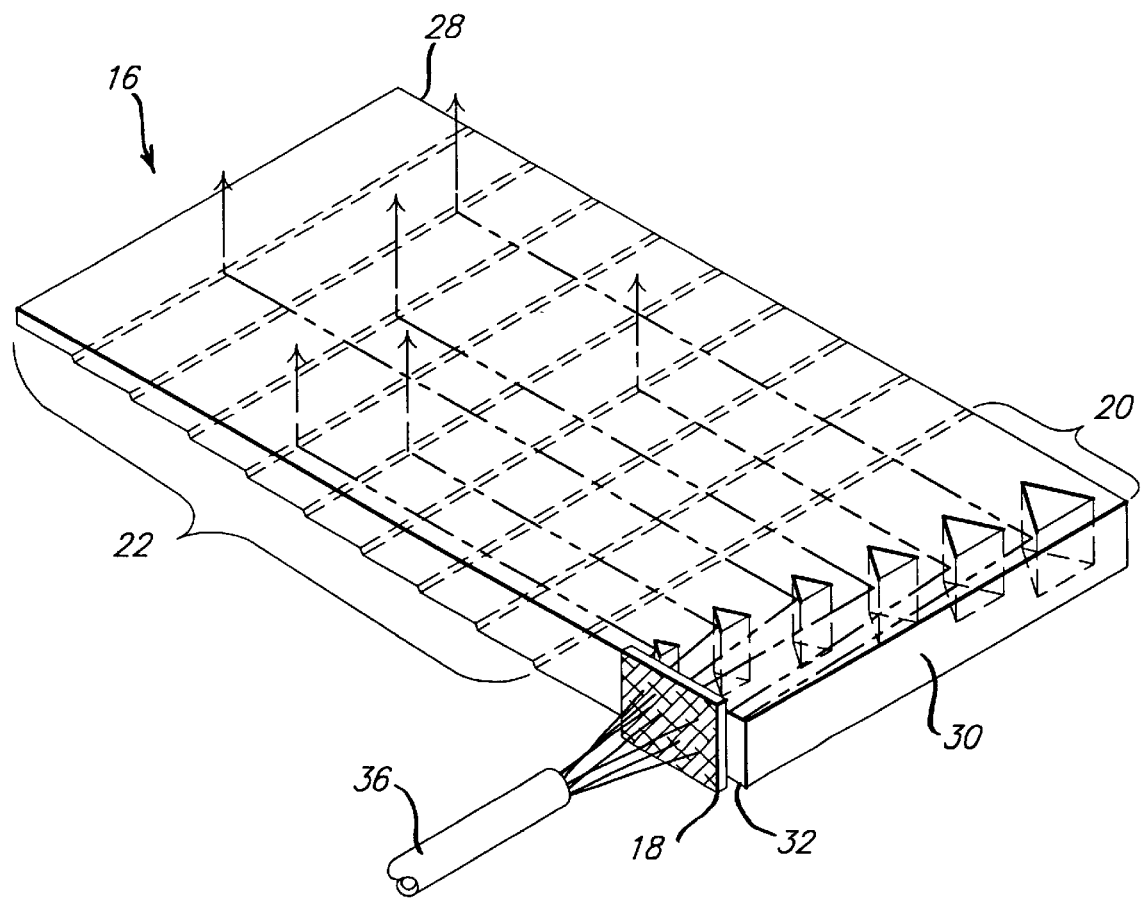
FIG. 2 is a perspective view of a thin sheet optical element coupled with a diffractive optical element according to the present invention.
Figure 3:
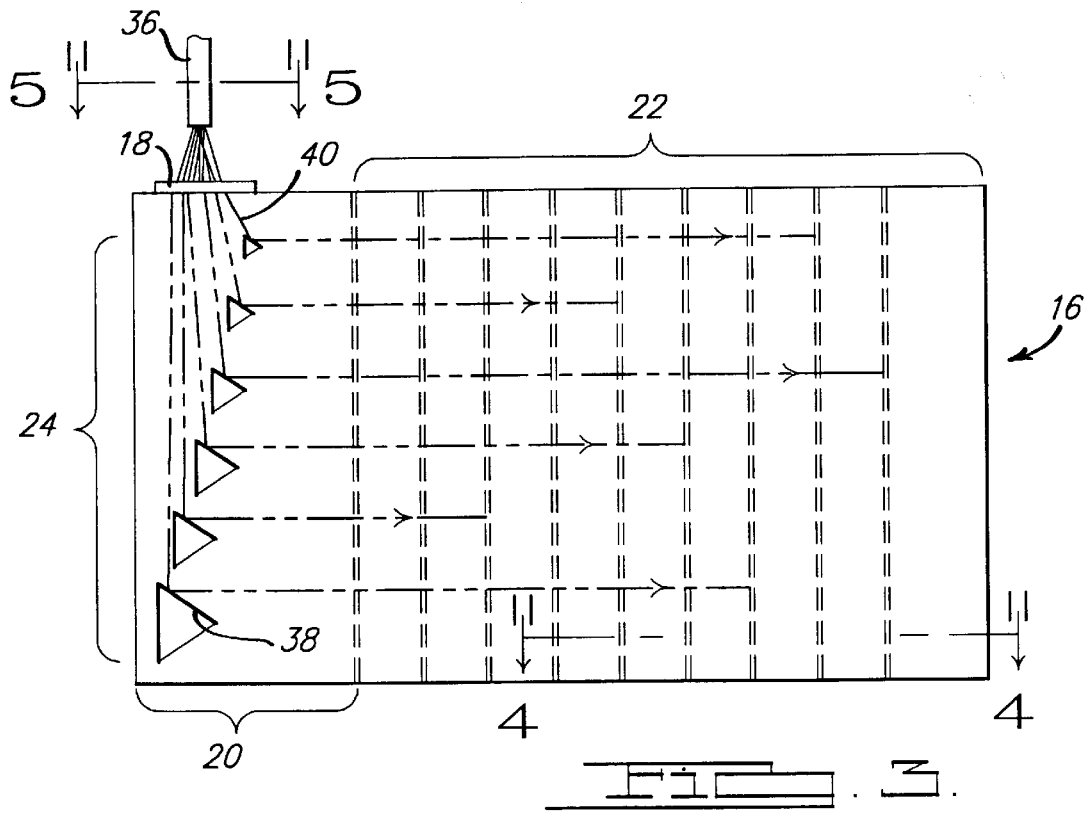
FIG. 3 is a top plan view of a thin sheet optical element coupled with a diffractive optical element according to the present invention.

Turning now to the drawings, and in particular to FIGS. 1, 2, and 3 thereof, an automotive vehicle 10 is shown having a remote lighting assembly using, in combination, a remote laser light source 12, a fiber optic light guide 14 coupled to the remote laser light source 12 at a first end 34 in conventional fashion, and a thin sheet optical element 16 adjacent a second end 36 of the light guide. The thin sheet optical element 16 of the present invention is herein configured as a vehicle tail lamp, however, those skilled in the vehicle lighting arts will understand that the thin sheet optical element 16 may be configured as a head lamp or used for other vehicle lighting applications. Hence, the present configuration is meant only to be illustrative and not limiting.

Figure 4:
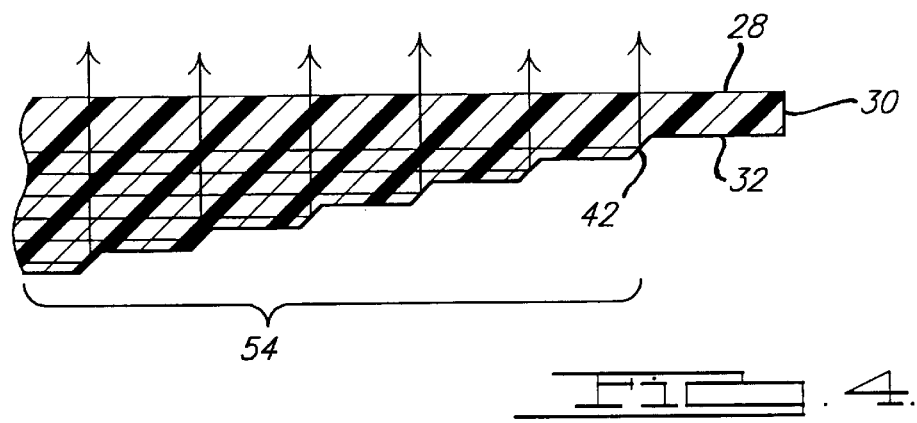
FIG. 4 is an enlarged sectional view of the kicker portion of the thin sheet optical element of FIG. 2 taken along the line 4—4.

As depicted in FIG. 2, a laser illuminated thin sheet optical element 16 is comprised of a diffractive optical element portion 18 which receives light from the light guide 14, a manifold section 20 that expands the incoming laser light, and a kicker section 22 that directs light normal to a front surface 28, as shown in FIG. 4, in a manner suitable for the specific application.

As illustrated in FIG. 1, a remote laser light source 12 is positioned in an automotive vehicle 10 with consideration given to vehicle design requirements and manufacturing ease relative to the particular lighting objectives. A possible location for the remote laser light source 12 is in the engine compartment (not shown). A single diode laser source is preferably used to provide light for the thin sheet optical element 16 of the vehicle 10. It is possible that a laser source can be positioned directly adjacent the thin sheet optical element 16. However, as herein described, light is transmitted from a remote laser light source 12 via a fiber optic light guide 14 to the thin sheet optical element 16. Diode lasers offer many advantages over conventional remote lighting sources such as halogen bulbs, light emitting diodes, and arc lamps. Most importantly, the diode laser has a radiance that is many orders of magnitude higher than conventional sources. For example, sources such as halogen lamps and light emitting diodes have brightnesses of 15–200 candelas per square millimeter in contrast to a laser which can typically have a brightness of 200,000 cd/mm$^2$. Additionally, lasers are more efficient at converting power into light of the desired wavelength. For example, in an incandescent lamp approximately 1.5% of the input power is converted into red light. Typical laser diodes emitting in the 635–670 nm band range have conversion efficiencies of approximately 15%. Also, because the laser diode does not rely on high temperatures to generate light, it may have a lifetime significantly longer than that of incandescent sources.

Preferably a fiber optic light guide 14 is utilized to transmit light from the remote laser light source 12. Because of the high brightness (candela per unit area) of the laser, small diameter (0.1–1.0 mm) glass fibers are preferably used to transmit the light. The use of small diameter glass fibers provides several benefits over the monofilament plastic pipes and glass fiber bundles used in non-laser based remote lighting systems. Small diameter glass fibers are less bulky than plastic pipes or glass fiber bundles which typically are 10–12 mm in diameter. Also, small diameter glass fibers are significantly cheaper than monofilament plastic pipe or glass fiber bundles. Plastic light pipes have the tendency to deteriorate and "yellow" when exposed to the environmental heat and the heat from the high intensity light of conventional remote light sources. Additionally, small glass fibers are easier to package, handle, and install than plastic pipes or glass fiber bundles and they weigh less. Finally, the directional nature of the laser and small area of the emitting aperture (approximately 1×250 $\mu m^2$) results in a coupling efficiency of greater than 85% into a 1 mm diameter fiber. Such an efficiency is difficult to achieve with conventional light sources using plastic pipe or glass fiber bundles.

Turning now to FIGS. 2–5, according to a preferred embodiment of the present invention, the unitary thin sheet optical element 16 is comprised of a diffractive optical element portion 18, a manifold section 20, and a kicker section 22. The unitary thin sheet optical element 16 is preferably a polymeric sheet ranging in thickness from 10 $\mu$m–6 mm. The thin sheet optical element 16 is generally rectangular and generally planar having a front surface 28, an opposing back surface 32 generally parallel to the front surface 28, and a perimeter edge 30 generally normal to the front and back surfaces 28 and 32, respectively. The thin sheet optical element 16 may also have a curved profile depending on particular design requirements. The front surface 28 is situated to receive light from the kicker section 22. The thin sheet optical element 16 is preferably made from a transparent, solid piece of plastic such as polycarbonate and utilizes the principle of total internal reflection (TIR) to reflect light. TIR is explained in more detail below. Other transparent materials such as acrylics may also be used.

The remote laser light source 12 is connected to a first end 34 of the fiber optic light guide 14 via a light coupler (not shown) such as those known in the art. The second end 36 of the fiber optic light guide 14 is situated adjacent to the diffractive optical element portion 18 of the thin sheet optical element 16. In use, light is emitted from the remote laser light source 12, is received by the fiber optic light guide 14 via a light coupler, is transmitted through the fiber optic light guide 14 via TIR, and is emitted at the second end 36 incident upon the diffractive optical element portion 18 of the thin sheet optical element 16.

Figure 5:
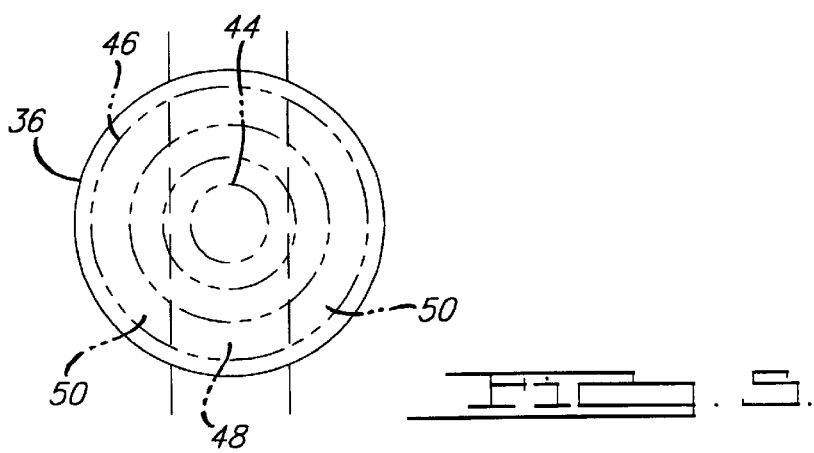
FIG. 5 is an enlarged sectional view of the light guide of FIG. 2 taken along the line 5—5.

In FIG. 2, a plan view of the diffractive optical element portion 18 is shown. The light is received from the second end 36 of the fiber optic light guide 14 with a spread angle of approximately 20°–50°. Light enters the sheet through a diffractive optical element portion 18 placed at the perimeter edge 30 of the thin sheet optical element 16. The diffractive optical element portion 18 is designed to divide the light up into equal intensity beams of light, and in the present case six beams of equal intensity light. This is advantageous for a number of reasons. As shown in FIG. 5, a cross section of the fiber optic light guide 14, illustrates how the light intensity of the laser varies from the center 44 where it is the greatest, to the perimeter 46 where it is the weakest. The light intensity distribution may fairly be described in this way for illustrative purposes, but in fact has a more complex distribution. Dividing the light into three sections, as illustrated with the pair of vertical lines in FIG. 5, yields three sections of varying intensity light. A central portion of high intensity light 48, and two sections of lower intensity light 50. This makes the task more difficult for the designer as the manifold section 20 and kicker section 22 would have to be specifically designed to avoid zones of varying intensity illumination. Having beams of equal intensity light 40 transmitted to each reflector 38 eliminates this problem. Further, because each reflector 38 is receiving a beam of equal intensity light 40, light expansion and collimation mechanisms typically located within the manifold portion 20 may now be eliminated. This results in a smaller manifold section 20 which results in a smaller overall footprint of the thin sheet optical element 16. The diffractive optical element portion 18, as disclosed for example in U.S. Pat. No. 5,323,302, may either be formed integrally with the thin sheet optical element 16 or may be separately attached to the perimeter edge 30. The light passing through the diffractive optical element portion 18 is directed toward the manifold section 20.

As shown in FIGS. 2 and 3, the manifold section 20 of the present device preferably consists of a plurality of triangular holes 24 which form a plurality of corresponding reflective surfaces, each reflective surface 38 functions to expand the light in the direction of the kicker section 22. The holes can take a variety of shapes and vary in number depending on the particular design objectives without departing from the scope of the present invention. Each reflective surface 38 receives a corresponding beam of equal intensity light 40 directed from the diffractive optical element portion 18. The reflective surface 38 may be linear or curved depending on the spread angle of light desired. Six light beams and corresponding holes 24 are preferable for the present invention.

The reflective surface 38 formed via the holes 24 of the manifold section 20 is a plastic-air interface. The reflective surface 38 receives a beam of equal intensity light 40 from the diffractive optical element portion 18. Light incident upon the plastic-air interface totally internally reflects within the thin sheet optical element 16 in the direction of the kicker section 22. Total internal reflection of the light occurs when an incident angle $\Pi$ exceeds a critical angle $\Pi_c$ given by the equation $\Pi_c = \sin^{-1}(n_1/n_2)$ wherein $n_1$ is the index of refraction of air and $n_2$ is the index of refraction of plastic. The plastic-air interface can be metalized if necessary to prevent the light rays from reflecting out of the thin sheet optical element 16.

As shown in FIG. 5, the kicker section 22 is a series of steps 54 which are aligned to receive light reflected from the reflective surface 38. Each incremental step 54 has an angled surface 42 and a back surface 32. The back surface 32 is parallel to the front surface 28. The angled surface 42 of the steps 54 are angled relative to the light received from the reflective surface 38 to reflect the light via TIR through the front surface 28. The angled surface 42 may be linear or curved depending on the spread angle of light desired. The angled surface 42 can be metalized if the light rays strike the plastic-air interface at an angle less than the critical angle. Functionally, the diffractive optical element portion 18 and manifold section 20 modify the angular and spatial distribution of the light in such a way that the light is directed out of the device by the kicker section 22.

Only one embodiment of the tail lamp assembly of the present invention has been described. Those skilled in the automotive lighting arts will appreciate that others may be possible without departing from the scope of the following claims.

We claim:

1. A manifold for transmitting light from a light source for use in an automotive vehicle, said manifold comprising:

a sheet of optical material having a front surface, a back surface, a perimeter edge and a plurality of reflective facets disposed in said optical material; and a diffractive optical element disposed integral with or on said perimeter edge and dividing said light into a predetermined number of equal intensity light beams transmitted through said optical material to said facets.

2. A manifold according to claim 1, wherein said plurality of reflective facets are equivalent in number to said predetermined number of light beams.

3. A manifold according to claim 2, wherein each of said plurality of reflective facets is situated to reflect a corresponding one of said predetermined number of light beams.

4. A manifold according to claim 1, wherein said sheet of optical material is a transparent polymer.

5. A manifold according to claim 1, wherein said sheet of optical material has a thickness between 10 $\mu$m–6 mm.

6. A manifold according to claim 1, wherein said sheet of optical material and said diffractive optical element are unitary in structure.

7. A manifold according to claim 1, wherein said plurality of reflective facets are apertures formed in said sheet of optical material so as to create a plastic-air interface.

8. A manifold according to claim 1, wherein said plurality of reflective facets each has a curvilinear reflecting surface.

9. A lamp assembly for use in an automotive vehicle, said lamp assembly comprising:

(a) a light source for generating light;

(b) an optical element positioned with respect to said light source for receiving light therefrom, said optical element comprising:

(i) a sheet of optical material having a front surface, a back surface and a perimeter edge, said sheet of optical material having a plurality of reflective facets disposed therein;

(ii) a diffractive optical element disposed integral with or on said perimeter edge, positioned to receive said light, and dividing light into a predetermined number of equal intensity light beams, said light beams transmitted through said optical material to said plurality of reflective facets; and (iii) A kicker portion adjacent said sheet of optical material having a plurality of reflective steps extending a length of said optical material, each of said reflective steps being aligned with said plurality of reflective facets and skewed with respect to said front surface.

10. A lamp assembly according to claim 9, wherein said light source is a diode laser.

11. A lamp assembly according to claim 9, wherein said optical material has a thickness between 10 $\mu$m–6 mm.

12. A lamp assembly according to claim 9, wherein said optical material is unitary in structure.

13. A lamp assembly according to claim 12, wherein said unitary optical material is comprised of a polymeric material.

* * * * *